US010402765B1

(12) United States Patent
Lushear et al.

(10) Patent No.: US 10,402,765 B1
(45) Date of Patent: Sep. 3, 2019

(54) ANALYSIS FOR NETWORK MANAGEMENT USING CUSTOMER PROVIDED INFORMATION

(71) Applicant: Sprint Communications Company L.P., Overland Park, KS (US)

(72) Inventors: Brian D. Lushear, Winter Springs, FL (US); Paul Andrew Shinholster, Jr., Orlando, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 1091 days.

(21) Appl. No.: 14/624,527

(22) Filed: Feb. 17, 2015

(51) Int. Cl.
*G06Q 10/06* (2012.01)
*G06Q 30/00* (2012.01)
*G06Q 10/00* (2012.01)

(52) U.S. Cl.
CPC ..... *G06Q 10/06316* (2013.01); *G06Q 30/016* (2013.01)

(58) Field of Classification Search
None
See application file for complete search history.

(56) References Cited

U.S. PATENT DOCUMENTS 5,825,775 A 10/1998 Chin et al.
5,898,826 A 4/1999 Pierce et al.
5,982,753 A 11/1999 Pendleton et al.
6,046,988 A 4/2000 Schenkel et al.
6,226,265 B1 5/2001 Nakamichi et al.
6,393,483 B1 5/2002 Latif et al.
6,570,867 B1 5/2003 Robinson et al.
6,650,347 B1 11/2003 Nulu et al.
6,700,967 B2 3/2004 Kleinoder et al.
6,788,697 B1 9/2004 Aweya et al.
6,792,273 B1 9/2004 Tellinger et al.
6,813,634 B1 11/2004 Ahmed
6,963,575 B1 11/2005 Sistanizadeh et al.
6,973,042 B1 12/2005 Fitzgerald
(Continued)

OTHER PUBLICATIONS

"Traceroute", Wikipedia, http://en.wikipedia.org/w/index.php?title=Traceroute&printable=yes, Oct. 19, 2009, pp. 1-4, Wikipedia.org.

*Primary Examiner* — Alan S Miller
*Assistant Examiner* — Alan Torrico-Lopez

(57) ABSTRACT

Embodiments of the disclosure include systems and methods for analyzing network management using customer provided information. A system comprises a computer having a processor and a memory; and an application stored in the memory that, when executed by the processor, identifies a plurality of customer sites; receives customer input information for each of the customer sites, wherein input information includes a priority level for the customer site, a number of employees at the customer site, a type of customer site, services provided by the customer site, and the redundancy of the services provided by the customer site; monitors the performance of each of the customer sites and service to each of the customer sites; determines one or more trouble tickets for each of the customer sites based on issues in the monitored performance for each of the customer sites; and prioritizes the trouble tickets based on the customer input information.

16 Claims, 4 Drawing Sheets

(56) References Cited

U.S. PATENT DOCUMENTS 6,978,223 B2 12/2005 Milliken
7,016,301 B1 3/2006 Moore
7,099,305 B1 8/2006 Fardid
7,099,912 B2 8/2006 Ishizaki et al.
7,110,362 B2 9/2006 Kato
7,143,152 B1 11/2006 Elman et al.
7,213,021 B2 5/2007 Taguchi et al.
7,225,139 B1 5/2007 Tidwell et al.
7,376,719 B1 5/2008 Shafer et al.
7,376,864 B1 5/2008 Hu et al.
7,424,526 B1 9/2008 Hansen et al.
7,464,152 B2 12/2008 Ishizaki et al.
7,467,225 B2 12/2008 Anerousis et al.
7,751,392 B1 7/2010 Gonzalez et al.
7,830,816 B1 11/2010 Gonzalez et al.
7,831,709 B1 11/2010 Ham et al.
7,869,432 B1 1/2011 Mollyn
7,904,533 B1 3/2011 Gonzalez et al.
7,904,553 B1 3/2011 Ham et al.
7,917,854 B1 3/2011 Beaudoin et al.
7,940,676 B2 5/2011 Griffin et al.
7,983,174 B1 7/2011 Monaghan et al.
8,139,475 B2 3/2012 Vercellone et al.
8,289,878 B1 * 10/2012 Gonzalez ............ H04L 41/5061 370/254
8,301,762 B1 * 10/2012 Lobo ................. G06F 17/30598 709/224
8,355,316 B1 1/2013 Lushear et al.
8,458,323 B1 * 6/2013 Baader, II ........... H04L 41/5074 709/223
8,644,146 B1 * 2/2014 Kurtz .................. H04L 41/5054 370/230.1
9,305,029 B1 4/2016 Lobo et al.
2002/0022985 A1 2/2002 Guidice et al.
2002/0078232 A1 6/2002 Simpson et al.
2002/0087393 A1 7/2002 Philonenko
2002/0101821 A1 8/2002 Feldmann et al.
2002/0103631 A1 8/2002 Feldmann et al.
2002/0103921 A1 8/2002 Nair et al.
2002/0164007 A1 11/2002 Henits
2002/0172148 A1 11/2002 Kim et al.
2002/0181047 A1 12/2002 Lauder et al.
2002/0186259 A1 12/2002 Meandzija et al.
2003/0051195 A1 3/2003 Bosa et al.
2003/0055972 A1 3/2003 Fuller et al.
2003/0145072 A1 7/2003 Lau et al.
2003/0152067 A1 8/2003 Richmond et al.
2003/0154404 A1 8/2003 Beadles et al.
2004/0006618 A1 1/2004 Kasai et al.
2004/0010496 A1 1/2004 Behrendt et al.
2004/0031059 A1 2/2004 Bialk et al.
2004/0059781 A1 3/2004 Yoakum et al.
2004/0064581 A1 4/2004 Shitama et al.
2004/0071164 A1 4/2004 Baum
2004/0139193 A1 7/2004 Refai et al.
2004/0210621 A1 10/2004 Antonellis
2004/0264484 A1 12/2004 Kui et al.
2005/0022189 A1 1/2005 Proulx et al.
2005/0027845 A1 2/2005 Secor et al.
2005/0091482 A1 4/2005 Gray et al.
2005/0094653 A1 5/2005 Milburn et al.
2005/0240835 A1 10/2005 Dragnea et al.
2006/0002401 A1 1/2006 Mukherjee et al.
2006/0031077 A1 2/2006 Dalton et al.
2006/0067237 A1 3/2006 Burns et al.
2006/0146694 A1 7/2006 Hamaguchi et al.
2006/0167703 A1 7/2006 Yakov
2006/0187855 A1 8/2006 Booth et al.
2006/0215577 A1 9/2006 Guichard et al.
2006/0268740 A1 11/2006 Rosenberg et al.
2006/0287593 A1 12/2006 Jaggu et al.
2007/0041554 A1 2/2007 Newman et al.
2007/0050497 A1 3/2007 Haley et al.
2007/0053368 A1 3/2007 Chang et al.
2007/0250625 A1 10/2007 Titus
2007/0274285 A1 11/2007 Werber et al.
2007/0280241 A1 12/2007 Verma
2008/0002975 A1 1/2008 Vukovic et al.
2008/0052539 A1 2/2008 MacMillan et al.
2008/0313491 A1 12/2008 Adams, Jr. et al.
2008/0317039 A1 12/2008 Satterlee et al.
2009/0006112 A1 1/2009 White et al.
2009/0067324 A1 3/2009 Licardie et al.
2009/0198832 A1 8/2009 Shah et al.
2009/0201911 A1 8/2009 DuPertuis et al.
2009/0222547 A1 9/2009 Boylan et al.
2009/0234946 A1 9/2009 Luo et al.
2009/0296588 A1 12/2009 Nishi et al.
2010/0153537 A1 6/2010 Wang et al.
2010/0195489 A1 8/2010 Zhou et al.
2010/0293163 A1 * 11/2010 McLachlan .............. G06N 5/04 707/736
2011/0004885 A1 1/2011 Kikuchi et al.
2011/0013643 A1 1/2011 Yang et al.
2013/0179736 A1 * 7/2013 Gschwind ........... G06F 11/3006 714/37
2015/0195154 A1 * 7/2015 Hevizi .................. H04L 43/024 706/50
2016/0048938 A1 * 2/2016 Jones ............... G06Q 10/06315 705/7.28

* cited by examiner

ANALYSIS FOR NETWORK MANAGEMENT USING CUSTOMER PROVIDED INFORMATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise or business may maintain multiple offices in various locations. The business may subscribe to a communication service provider. The communication services may be defined, at least in part, by a service level agreement (SLA) that may define a class of service (CoS), a bandwidth, and other key communication parameters. A quality of service (QoS) and/or a class of service associated with the communication service may also be stated or implied in the SLA. An SLA may also define service availability, time to identify the cause of a customer-affecting malfunction, time to repair a customer affecting-malfunction, service provisioning time, and/or other metrics.

Virtual private networks (VPN) may be used by businesses to communicate confidentially within the business, between different sites, offices, or campuses, over a public communications network. VPN traffic can be carried over a public network infrastructure, such as the Internet, on top of standard protocols, or over a service provider network (SPN) with a defined SLA between the subscriber and the service provider. A VPN can send a variety of communications traffic including data, voice, video, or a combination of these and other traffic. In some cases, VPNs may be provided based on multi-protocol label switching (MPLS) techniques. While traversing the network, communications may travel via different paths through different devices, depending on the availability of a given device at a given time.

The subscriber may obtain connectivity to the Internet by subscribing to an Internet service provided by a service provider network. The service provider network may provide Internet service via a port on a router operated by the service provider network. The port on the router may be dedicated or reserved primarily or completely for the use of the subscriber. The subscriber connectivity to the Internet may be provided directly or indirectly by a single communication link from the subscriber to a port on a router. A router is an electronic device that provides connectivity between two networks and typically supports routing of data packets to other network nodes based on addresses embedded in the header of the data packets. Data packets may traverse from one site of the business to another site of the business via an almost-infinite number of paths through the Internet.

SUMMARY

In an embodiment, a system is disclosed. The system comprises a computer having a processor and a memory and an application stored in the memory that, when executed by the processor, identifies a plurality of customer sites; receives customer input information for each of the customer sites, wherein input information includes services provided by the customer site, and the redundancy of the services provided by the customer site; monitors the performance of each of the customer sites and service to each of the customer sites; determines one or more trouble tickets for each of the customer sites based on issues in the monitored performance for each of the customer sites; prioritizes the trouble tickets; independently monitors a service provided by the customer site; reprioritizes the trouble tickets for that customer site based on a status of the independently monitored service; receives additional customer input information, after the trouble ticket(s) have been determined for a customer site; and reprioritizes the trouble ticket(s) for that customer site based on the additional customer input information.

In another embodiment, a system is disclosed. The system comprises a computer having a processor and a memory and an application stored in the memory that, when executed by the processor, identifies a plurality of customer sites; receives customer input information for each of the customer sites, wherein input information includes a priority level for the customer site, a number of employees at the customer site, a type of customer site, services provided by the customer site, and the redundancy of the services provided by the customer site; monitors end-to-end the data communication between the customer sites, performance of each of the customer sites, and service to each of the customer sites; determines the content of one or more trouble tickets for each of the customer sites based on issues in the monitored performance for each of the customer sites; creates the one or more trouble ticket containing the determined content, wherein a customer may access the one or more trouble ticket; and prioritizes the trouble tickets based on the customer input information.

In yet another embodiment, a method is disclosed. The method comprises identifying a plurality of customer sites; receiving customer input information for each of the customer sites, wherein input information includes a priority level for the customer site, a number of employees at the customer site, a type of customer site, services provided by the customer site, and the redundancy of the services provided by the customer site; monitoring end-to-end the data communication between the customer sites, performance of each of the customer sites, and service to each of the customer sites; determining the content of one or more trouble tickets for each of the customer sites based on issues in the monitored performance for each of the customer sites; creating the one or more trouble ticket containing the determined content, wherein a customer may access the one or more trouble ticket; and prioritizing the trouble tickets based on the customer input information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
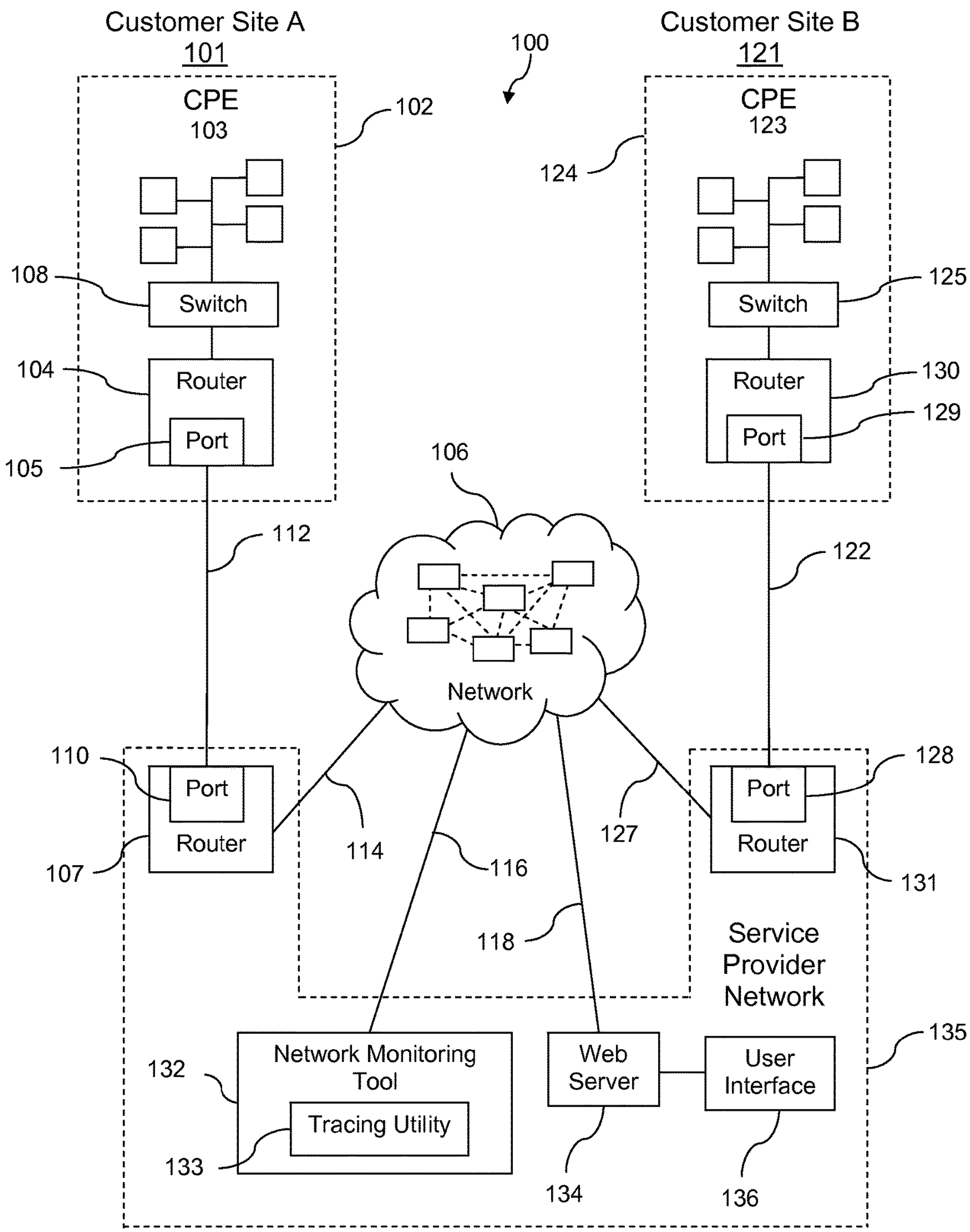
FIG. 1 is an illustration of a communication network monitoring system for implementing several embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method are taught that provide end-to-end monitoring of a data communication system between a plurality of customer networks. Additionally, while other systems and tools may be designed to look only at a single communication link or to analyze communications between two computer systems directly connected at the network layer, the present disclosure teaches analyzing end-to-end communication that may involve many network computers and/or routers. The customer networks may be at the same or different physical locations or sites. Communications, in the form of data packets, may travel between the customer networks, at least in part, via the Internet. In an embodiment, the system and method may use a system monitoring tool to characterize the devices the data packets traverse as they travel between networks. This characterization may be from a specific location at each of several customer networks, such as from/to the so-called "edge routers" at two or more of the customers' locations. In another embodiment, the system monitoring tool may use a tracing utility to identify and characterize the routers that data packets traverse when moving from one customer network to another customer network. The system monitoring tool may operate continuously or may be set to run periodically.

In an embodiment, the system monitoring tool may log information collected by the tracing utility and may then analyze the information to diagnose and/or correct communication problems between the networks. In another embodiment, the system and method may provide the customer with the ability to self-diagnose and/or correct communication issues, and may provide a customer or customers with the ability to create restrictions for their end users to filter specific ports, devices, and/or features of the system and method. The system and method may also be configured to allow customers to suppress alarms and/or service ticket generation during maintenance procedures.

In an embodiment, the system and method may reduce the workload of the communication service provider and may thereby allow the communication service provider to reduce costs. The system and method may also allow the customer to determine an appropriate level or class of service to better serve the customers needs, based on analyzing communication system information provided by the system monitoring tool and the tracing utility.

In an embodiment, the system may receive and store customer input information related to the monitored systems. Customer input information may be utilized when determining priority for maintenance of the system, such as trouble tickets. Maintenance schedules may be reprioritized based on customer input information. For example, the priority of trouble tickets may be rearranged based on customer input information. Additionally, customers may provide access or information about services provided by each customer site, where these services may be independently monitored. Monitoring the services provided by the customer sites may also contribute to priority for maintenance. The customer may also input information about revenue at risk at a site, for example where the customer may lose a predictable amount of money if a site loses communication connectivity, for example if the site comprises an on-line commerce system.

As an example, a customer may indicate that a customer site provides email service for a system. The email service may then be independently monitored, separate from the activity at the customer site. Then, if a service issue arises at that customer site, the priority of the trouble ticket for that issue may depend on the status of the independently monitored email service. If the email service is uninterrupted, the trouble ticket may have a lower priority, while if the email service is down, especially if there is no redundancy for that service, the trouble ticket may be reprioritized to a higher position.

Turning now to FIG. 1, a system 100 is described. The system 100 comprises a customer site A 101 with a network 102. The network 102 comprises customer premises equipment (CPE) 103, which comprises a plurality of computers, a switch 108, a customer edge router 104, and a customer edge port 105. In an embodiment, the switch 108 may be a specialized switching system or apparatus to direct communications traffic, and may control the flow of data packets from the plurality of computers of the CPE 103 to the customer edge router 104. In an embodiment, the customer edge port 105 may comprise a plurality of ports, and may comprise additional connections which may be to other networks and/or other service provider networks.

The system 100 also includes a similar arrangement for a customer site B 121. Customer site B 121 comprises a network 124. Network 124 comprises a CPE 123, which comprises a plurality of computers, a switch 125, a customer edge router 130, and a customer edge port 129. The customer site A 101 and the customer site B 121 may represent two locations of the same enterprise or business that may be proximate to one another or may be separated by substantial distance. The network 102 at customer site A 101 and the network 124 at customer site B 121 may be linked to facilitate communicate between one another, via a network 106 (which may provide connectivity to the internet).

The communication service for the network 102 may be provided, in part, by a communication link 112. In an embodiment, the link 112 may be from the CPE 103, via the switch 108, the customer edge router 104, and a customer edge port 105, to a provider edge port 110, and to a provider edge router 107. The provider edge router 107 may provide access to the network 106 via a link 114. Thus, the CPE 103 may access the network 106 for, as an example, accessing content from a content server (not shown) via the switch 108, the customer edge router 104, the customer edge port 105, the link 112, the provider edge port 110, the provider edge router 107, and the link 114, where the content server (not shown) is connected to the network 106.

Communication service for customer site B network 124 may be provided, in part, by a communication link 122. In an embodiment, the link 122 may be from the CPE 123 via the switch 125 and the customer edge router 130, the customer edge port 129, to the provider edge port 128 and the provider edge router 131. The connection to the network 106 may be from the provider edge router 131, via the link 127 to the network 106.

The system 100 also comprises a service provider network 135. The service provider network 135 comprises the provider edge port 110 and the provider edge router 107, as well as the provider edge port 128 and the provider edge router 131, all of which are described above. In addition, the service provider network 135 comprises a web server 134 and a network monitoring tool 132, wherein the web server 134 may be connected to the network 106 via a link 118, and wherein the network monitoring tool 132 may be connected to the network 106 via a link 116. The communication service of the service provider network 135 may include one or more of VPN service (such as an MPLS VPN delivered over an IP backbone), email service, multimedia communication service, video conference service, voice communication service, frame relay service, data communication service, and other communication services. In an embodiment, the provider edge routers 107, 131 may be implemented by a computer system provided with software and interfaces that facilitate receiving and forwarding of data packets. Computer systems are discussed in greater detail hereinafter. In an embodiment, the receiving and forwarding of data packets may be referred to as routing.

Also illustrated in system 100 is a depiction of the network 106, comprising a plurality of devices such as routers, servers, computers, and/or other devices. One skilled in the art will appreciate that the plurality of devices of the network 106 may be interconnected, either physically or via wireless communication (not shown) to provide paths for communications to travel from one location to another over the network 106. The dotted lines between these devices indicate that the connections may be dynamic and the associated paths from one point to another may change from time-to-time. Path changes may be the result of individual devices becoming overloaded, disabled, or otherwise unavailable to transmit data packets via the network 106. While an exemplary interconnectivity mesh is illustrated among the plurality of devices of the network 106, for example routers, it is understood that other connectivity meshes among the devices of the network 106 are also within the spirit of the present disclosure. When a device becomes unavailable, the data packets may be rerouted through an alternate path to the destination.

In some embodiments, the provider edge routers 107, 131 may contain a specialized operating system, such as the 10S, the JUNOS, or the XOS operating systems. In other embodiments, the provider edge routers 107, 131 may employ general purpose operating systems such as the UNIX, the LINUX, or the WINDOWS operating systems. In some embodiments, the provider edge routers 107, 131 may be referred to as network switches, layer 3 switches, provider edge switches, or switches. The provider edge routers 107, 131 may support many communication protocols, including Network protocol (IP), multi-protocol label switching (MPLS), asynchronous transfer mode (ATM), and/or others. The provider edge routers 107, 131 may range in capacity from small to large traffic handling capability. While shown in FIG. 1 as outside of the cloud representing the network 106, the provider edge routers 107, 131 may be considered inside the cloud of the network 106. It is well known that routers, for example provider edge routers 107, 131, make up a substantial portion of the nodes considered within the cloud of the network 106.

In an embodiment, the connection from network 102 at customer site A 101 to the network 106, and the connection from network 124 at customer site B 121 to the network 106, through the devices and links described above, may facilitate secure communications via a VPN between the two customer sites across the network 106. The switches, routers, and links comprising the network 102, the network 124, and the service provider network 135 described above may be the same or similar in a plurality of communication scenarios between the network 102 at customer site A 101 to the network 124 at customer site B 121. However, the path across the network 106 that may connect the customer site A network 102 to the customer site B network 124 may proceed via a different path at any time, as the availability of devices and links traversed while crossing the network 106 may vary.

In an embodiment, the network monitoring tool 132 may comprise a tracing utility 133. The tracing utility 133 may be one of traceroute, traceroute6, layer four traceroute, TCP-traceroute, tracecert, MTR, PathPing, or other utility program or tool for determining packet routes and/or other packet transport metrics. The tracing utility 133 selected for use with the network monitoring tool 132 may be determined, at least in part, by the operating system of the system 100 such as the UNIX, the Linux, one of a plurality of versions of the MS Windows, or other operating systems. In an embodiment, the tracing utility 133 may be part of an operating system such as FreeBSD, NetBSD, OpenBSD, DragonFly BSD, Mac OS X, or other operating systems.

The network monitoring tool 132 may use the tracing utility 133 to identify a plurality of routers traversed by data packets as they travel from one location to another, for example, from customer site A network 102 to customer site B network 124. The network monitoring tool 132 may further use the information returned by the tracing utility 133 to determine a performance of each router that the data packets traverse. Performance metrics may include, but may not be limited to, latency, jitter, queue overflow, bit error, and data packet loss. These metrics may be factors that affect quality of service and may be part of an SLA. In an embodiment, the network monitoring tool 132 may be implemented as a computer system. Computer systems are discussed further hereinafter. In an embodiment, the tracing may analyze the transmission of data packets from customer site A network 102 to customer site B network 124 and may analyze the transmission of data packets from the customer site B network 124 in a return message back to customer site A network 102. In an embodiment, the tracing may further analyze the transmission of data packets from customer site B network 124 to customer site A network 102 and may analyze the transmission of data from customer site A network 102 in a return message back to the customer site B network 124.

In an embodiment, the tracing utility 133 may send a packet or packets of data configured to allow the routers to return details of the packet handling. The details may include the identity of the routers that handle the packets, the timestamp values returned from the routers as the packets are handled by the routers, and/or other router data packet handling information. The details of the routers that the packets traverse may be returned to the network monitoring tool 132 by the tracing utility 133 in a simple text format or other data format.

The information returned to the network monitoring tool 132 by the tracing utility 133 may be used to determine details of the routing of packets, in terms of the routers that the packets encounter, as well as the time-delay the packets experience at each router. In an embodiment, the time-delay encountered by the packets may be referred to as latency.

Latency values may be reported by the tracing utility 133 in time increments such as milliseconds (ms), and may be on the order of about 5 ms, about 25 ms, about 100 ms, or other amount of time. In an embodiment, the network monitoring tool 132 may log data of network latency and may determine an average or a mean latency for the network. This average or mean network latency may be used to determine a typical and/or an acceptable latency level.

In an embodiment, the network monitoring tool 132 may also use the information provided by the tracing utility 133 to determine a level of network jitter. Network jitter may be referred to as packet delay variation (PDV), and may be a factor of quality of service. Packet delay variation may be defined as the variation in the latency associated with packet transport. For instance, if packet transmission from one location to another experiences a network latency of, for example, 50 ms, but over a period of time the network latency remains constant, the network may be may be considered to have low packet delay variation. Low packet delay variation may be an aspect of high quality of service for a user of the network. Packet delay variation may be expressed as an average of the deviation from the network mean latency. Typical values for packet delay variation may be on the order of about 1 ms, about 5 ms, about 20 ms, or other value.

The tracing utility 133 may further provide the network monitoring tool 132 with information about data packet loss. Data packet loss may occur when one or more packets of data traversing a network, such as the network 106, fail to reach their destination. Data packet loss may occur for a variety of reasons, such as overloading of routers or other data handling components of the network 106, corrupted data packet rejection, signal degradation, or other issues that may result in data packet loss. Data packet loss may be another factor that negatively affects quality of service.

In an embodiment, the service provider network 135 may provide a customer, such as a customer that has multiple sites, with access to the network monitoring tool 132 as part of an SLA. User access may be provided via a user interface 136, web interface or by another interface. The customer may use the network monitoring tool 132 to monitor the total network quality (TNQ) of the network services provided by the service provider network 135 in an end-to-end manner. The network monitoring tool 132 may be configured to monitor data packet transmission from one customer site to another, for example from the network 102 at customer site A 101 to customer site B network 124, and/or any number of other customer sites. The network monitoring tool 132 may further be configured to provide network metrics to the customer and/or to the service provider network 135, and the network metrics may be used to determine a TNQ that may be specified in an SLA. In an embodiment, the network monitoring tool 132 may promote monitoring of a plurality of CPE's and/or a plurality of customers concurrently.

In another embodiment, the network monitoring tool 132 may log network metrics that may facilitate a customer determining whether or not they are efficiently utilizing their network communication equipment and/or service. The customer may analyze the logged metrics using the network monitoring tool 132 and may use the analysis to make adjustments to their system settings to more efficiently utilize their available bandwidth. For instance, the customer may delay or defer expenditures for additional services and/or equipment by modifying the class of service settings of their system and/or the class of service settings of the edge routers of the service provider network 135. This may allow the customer to modify packet handling to prioritize certain packets or classes of communications in order to increase system efficiency without incurring costs.

In an embodiment, the network monitoring tool 132 may provide real-time monitoring of network status. For the purposes of the present disclosure, the term real-time may be associated with an update rate of about one minute, about 2 minutes, about 5 minutes, about 15 minutes, or other period of time. The network monitoring tool 132 may perform continuous checks by conducting monitoring of data packet transmission continuously to provide real-time reporting of network communication system status. The network monitoring tool 132 may be configured to perform routine checks and log network performance for subsequent analysis and/or tracking. The network monitoring tool 132 may be configured to perform routine checks about hourly, about daily, about weekly, or other period of time. The log file may be made available to the customer and/or to the service provider. The network monitoring tool 132 may initiate network performance determinations based on time, system availability, special requests from the customer or the service provider network 135, or other triggering method in order to provide information to assess network performance. Additionally, specific checks can be monitored to determine the health of applications executed by the customer sites, such as domain name system (DNS), email servers, database servers, web servers, etc. The network monitoring tool 132 may incorporate the output of any testing condition that can be performed on the network 106.

In an embodiment, the network monitoring tool 132 may also be configured to provide an alert when network issues arise. For example, when the network monitoring tool 132 discovers an issue with data packet transmission or another aspect of network communication, it may notify an agent of the customer or an agent of the service provider network 135 of the issue. A notification may be one or more of an email message, an icon on a network monitoring terminal, a flashing display on a monitor, or other form of notification that network communications may have an issue or issues that may require attention.

In another embodiment, the network monitoring tool 132 may be configured to analyze historical network performance and provide predictions of network issues. For instance, the network monitoring tool 132 may determine, via extrapolating historical data, that a particular router of the network 106 may be subject to queue overflow on a particular day of the week. The network monitoring tool 132 may then configure the customer's network traffic to avoid this router during a period of time that has been determined to have issues for data communication. This process may further enhance the user experience of the network by avoiding delays, data loss, system downtime, or other issues that may negatively affect the customer and/or may be covered within an SLA. In an embodiment, the network monitoring tool 132 may be configured to provide predictive, preemptive, and/or diagnostic services for a customer or for the service provider network 135.

In an embodiment, the network monitoring tool 132 may provide a customer with the ability to diagnose their own network issues and may thereby avoid service calls and/or trouble tickets submitted to the service provider. The network monitoring tool 132 may be configured to give the customer the ability to visualize network issues, and may further allow the customer to diagnose and repair or avoid issues at a customer site or other location. In this manner, the customer may increase the system efficiency and/or uptime. By monitoring network communication between the plurality of customer sites and identifying communication issues, the customer may be able to provide a level of self-support that may result in lower cost of ownership of the communication system 100. This customer self-support may allow the service provider to realize reduced costs for operating and/or maintaining the system 100, and may thereby allow the service provider to pass cost savings along to customers. This ability to pass along cost savings to the customer may give the service provider an increased competitive advantage over other service providers. For additional details about VPNs, SLAs, and quality of service, see U.S. patent application Ser. No. 11/838,175 filed Aug. 13, 2007, entitled "Network Access and Quality of Service Troubleshooting," by Jose A. Gonzalez et al, which is hereby incorporated by reference in its entirety and U.S. patent application Ser. No. 12/036,289 filed Feb. 24, 2008, entitled "Flexible Grouping for Port Analysis," by David M. Ham et al, which is hereby incorporated by reference in its entirety.

In an embodiment, the network monitoring tool 132 may comprise a view restriction mechanism that provides the ability to configure a portion or portions the system 100 to restrict certain end users from accessing or viewing some aspects of the system 100, such as specific devices, ports, and/or features of the system 100. The customer may selectively provide access to some areas and/or features of the system to end users, in order to help prevent unauthorized use or changes to the system 100. For example, high-level operators and/or technicians may be given higher levels of access than some end users in order to facilitate system operation and/or maintenance, as well as to prevent system tampering or inadvertent system changes by unqualified personnel. The end users may access and control the system 100 via the user interface 136, wherein the network monitoring tool 132 may control what is shown and allowed on the user interface 136.

The network monitoring tool 132 may provide the ability to suppress alarms and/or service ticket generation for preventing unwanted alarms or ticket generation during maintenance procedures. For example, if a customer is performing routine scheduled system maintenance, and they do not want the network monitoring tool 132 to detect the actions as system malfunctions and thereby issue service tickets or setoff alarms while maintenance is underway, the customer may disable a portion or portions of the network monitoring tool 132. The customer may then be permitted to subsequently re-enable these portions of the network monitoring 132 tool when maintenance is completed. The ability to suppress alarms may also help prevent the misleading skewing of statistical communication error rates, where the communication errors may not be indicative of communication infrastructure problems but instead may be caused by the subject equipment having been deliberately placed into a maintenance mode of operation.

In some embodiments, the network monitoring tool 132 may be operable to receive customer input information (via the user interface 136) about the customer sites 101 and 121 controlled by the customer. Customer input information, along with information known by the network monitoring tool, such as location and size of bandwidth, may assist in troubleshoot processes conducted automatically and/or by technical solutions engineers when an issue arises in the system 100. Additionally, a customer may use the input information for each customer site to better understand the whole system 100, wherein a customer may have the ability to view the customer sites with filters based on the provided information.

For example, a customer may input a priority level for each location, which may in some embodiments be on a scale of 1-10, 1-5, or any other scale appropriate for the system 100. Also, the scale of priority level may be oriented so 1 is the highest priority, or it may be oriented so 1 is the lowest priority. In some embodiments, the customer sites 101 and 121 may optionally be ranked from 1 to N (number of sites). Any scale system could be used for determining a priority level for each customer site 101 and 121. A customer chosen priority level may help management and technical solutions engineers understand the urgency and value of a customer site 101 and 121 within a network (or system 100).

A customer may also provide specific information for each customer site, such as the number of employees at the customer site, which may provide the customers with an idea of human capital operating, and at risk, at a particular customer site. Additionally, a customer may provide the revenue generated at the customer site, which may allow the customers and technical solutions engineers to understand the financial value a location has to a particular network or system 100. A customer may also provide information about the type of customer site (such as research and development, headquarters, warehouse, etc.), as well as the services provided or applications run by the customer site (such as email hosting, DNS, VPN access, Internet, or another specialized or important activity). This may allow customers to quantify the service and application value of a location while providing technical solution engineers additional trouble shooting data. Additionally, a customer may provide information about the redundancy of the services at each site (for example, if the customer site is the sole source of the service or a redundant source), which may help technical solutions engineers better understand risk and may assist in troubleshooting.

In some embodiments, the customer may utilize a user interface 136 designed to receive the above mentioned information. The user interface 136 may comprise a form or chart of the possible information that may be input by a customer. Additionally, the user interface 136 may comprise a network map feature, wherein each of the customer sites 101 and 121 operated by a customer may be shown on the network map feature. The network map feature may also include filtering capabilities, wherein a user may filter the sites shown on the map using the input information and other known information for each of the customer sites 101 and 121. For example, filtering may allow a user to highlight different qualities or criteria on a graphical map of the sites, such as sites with active trouble tickets that also have more than 100 employees, or any other single criteria or combination of criteria. Filtering flexibility and instant feedback may encourage the customer/user to provide the data.

In some embodiments, trouble tickets may be created for issues in the system 100 detected by the network monitoring tool 132. The trouble tickets may be associated with one or more customer site(s) 101 and 121 that are affected by the issue. The trouble tickets may be prioritized based on a plurality of factors, including time created, severity of the issue, importance of the locations, etc.

In an embodiment where network monitoring tool 132 has access to the customer input information, the trouble tickets may be reprioritized based on the provided information. For example, if a customer has indicated that a first location is a higher priority than a second location, the trouble tickets for the first location may be prioritized higher than the trouble tickets for the second location. Additionally, if a user has indicated that a service provided by a location is essential, and this service is affected by the issue, that trouble ticket may be reprioritized higher than it would have been otherwise, thereby affecting the response of the network monitoring tool 132 and the service provider network 135.

In an exemplary embodiment, a customer site 101 may comprise an email server (or mail hosting server). The customer may provide this information to the network monitoring tool 132. Additionally, the network monitoring tool 132 may be operable to independently monitor the email activity of the system 100, wherein the access to monitor the email activity may be provided by the customer. When there is an outage or other issue affecting the customer site 101, the status of the independently monitored email activity may be considered when prioritizing the trouble ticket for that issue. For example, if there is an issue affecting customer site 101, but the email activity is not affected, the trouble ticket may have a lower priority, whereas, if the email activity is affected by the issue, the trouble ticket may have a higher priority. Also, if it is known that the email service is label redundant to another site's services (for example, a back-up email server), the trouble ticket may be reprioritized.

Another use of the customer provided information may be implemented by the user interface, wherein the user may have access to filters which may be used to control what is shown by the user interface, as well as supplemental information on maps, which may be shown when a user selects a certain location or site. The customer provided information may be received by the web server and organized by the user interface to be presented back to the user. Additionally, historical information for each of the customer sites may be available to a user via the user interface, such as previous outages and issues.

In some embodiments, a customer (or user) may be able to dynamically control the prioritization of trouble tickets and/or customer sites via the user interface. The user may be able to reprioritize a trouble ticket or issue via the user interface based on the user's knowledge and/or preferences.

In some embodiments, the network monitoring tool 132 may be operable to communicate notifications to a user based on the activity from each customer site that is received by the network monitoring tool 132. These notifications may be customized based on the customer information provided by the customer. Additionally, a customer may be able to control the notifications via the user interface, such as frequency, type of notification, criteria for notification, specific notifications for each customer site, etc.

In some embodiments, the customer input information, as well as the monitored information, may be used for other purposes which may be beneficial to the customer(s) and/or the service provider. For example, a server provider may use the information to generate network management advice and suggestions for changes or improvements to the system. Additionally, the service provider may use information from multiple customers to determine marketing techniques for new or improved service or products for each of the customers.

Figure 2A:
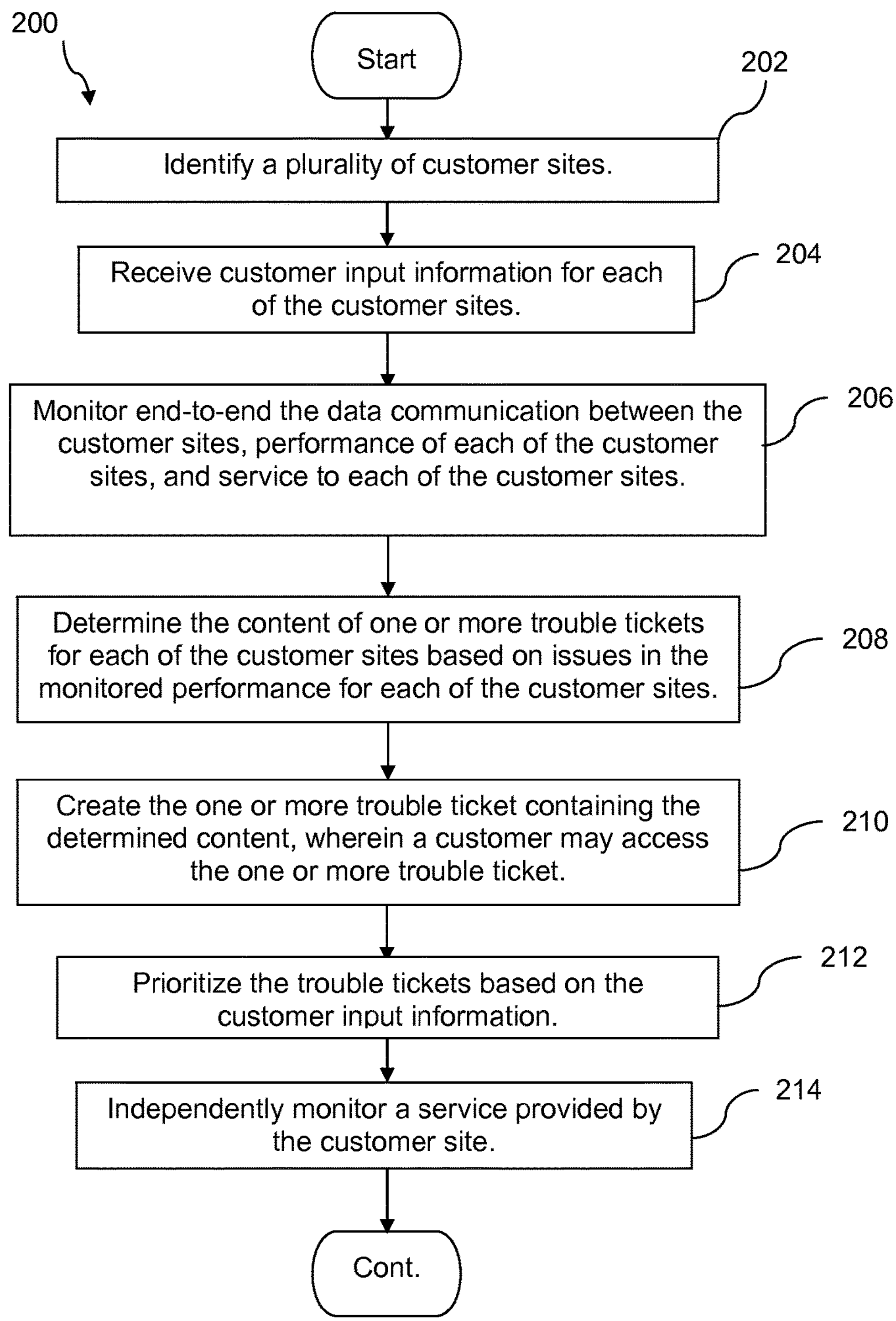
FIGS. 2A-2B are a flowchart of a method of monitoring a communication network according to an embodiment of the disclosure.
Figure 2B:
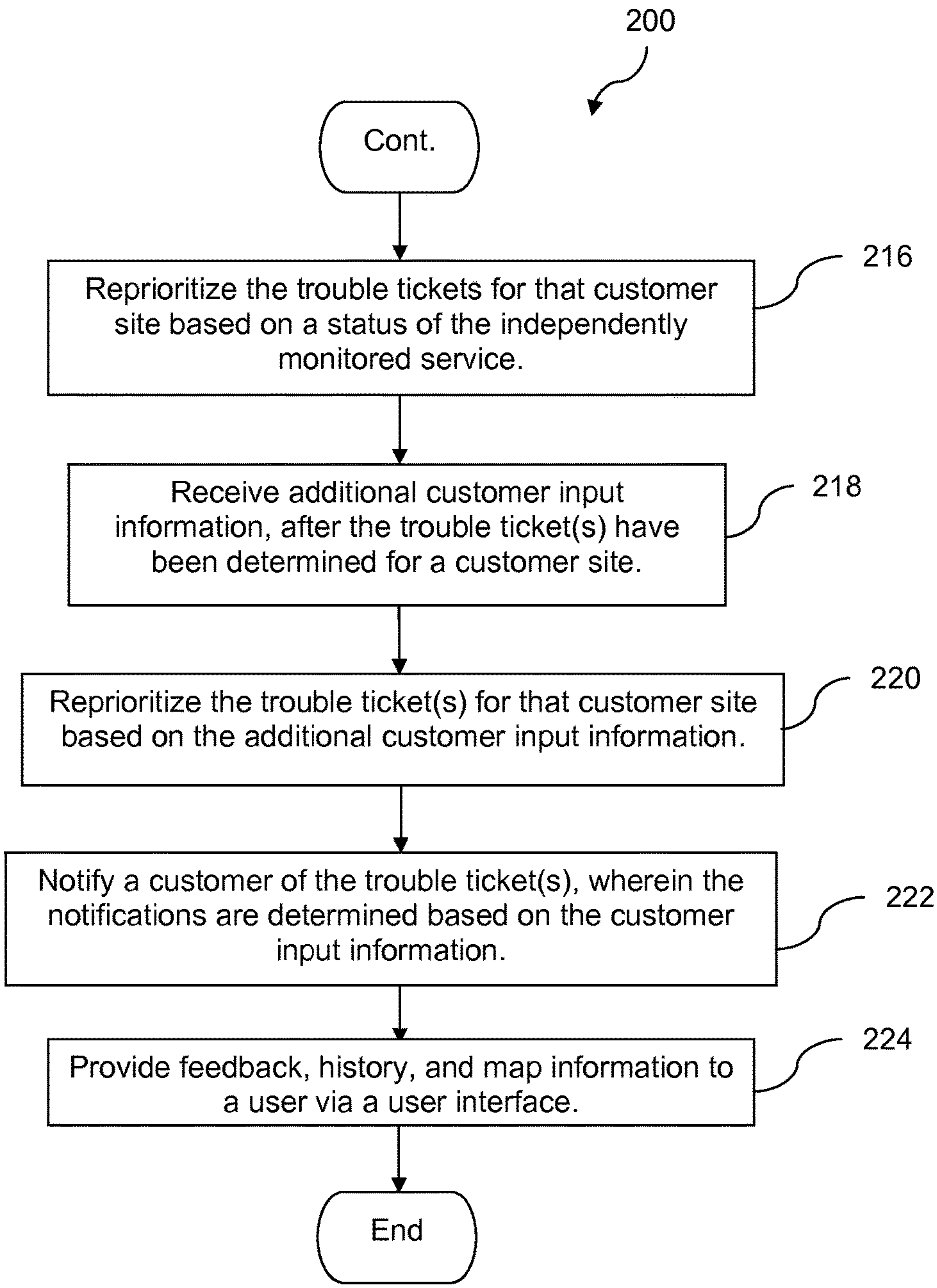

FIGS. 2A-2B illustrate a flowchart of a method 200 for analyzing network management using customer provided information. At step 202, a plurality of customer sites may be identified. At step 204, customer input information may be received for each of the customer sites, wherein input information may include a priority level for the customer site, a number of employees at the customer site, a type of customer site, services provided by the customer site, and the redundancy of the services provided by the customer site. At step 206, the data communication between the customer sites, the performance of each of the customer sites, and the service to each of the customer sites may be monitored end-to-end. At step 208, the content of one or more trouble tickets may be determined for each of the customer sites based on issues in the monitored performance for each of the customer sites. At step 210, the one or more trouble ticket may be created containing the determined content, wherein a customer may access the one or more trouble ticket. At step 212, the trouble tickets may be prioritized based on the customer input information.

In some embodiments, at step 214, a service provided by the customer site may be independently monitored. In some embodiments, at step 216, the trouble tickets for that customer site may be reprioritized based on a status of the independently monitored service. In some embodiments, at step 218, additional customer input information may be received, after the trouble ticket(s) have been determined for a customer site. In some embodiments, at step 220, the trouble ticket(s) for that customer site may be reprioritized based on the additional customer input information.

In some embodiments, the services provided by the customer site may comprise one or more of: email hosting, domain name system (DNS), virtual private networks (VPN) access, Internet, and other specialized activities. In some embodiments, input information may also include revenue generated at the customer site. In some embodiments, at step 222, a customer may be notified of the trouble ticket(s), wherein the notifications are determined based on the customer input information. In some embodiments, at step 224, feedback, history, and map information may be provided to a user via a user interface. In some embodiments, the feedback may comprise effects of adjustments made by a user, wherein the history comprises previous trouble tickets and issues, and wherein the map information comprises links for each customer site.

Figure 3:
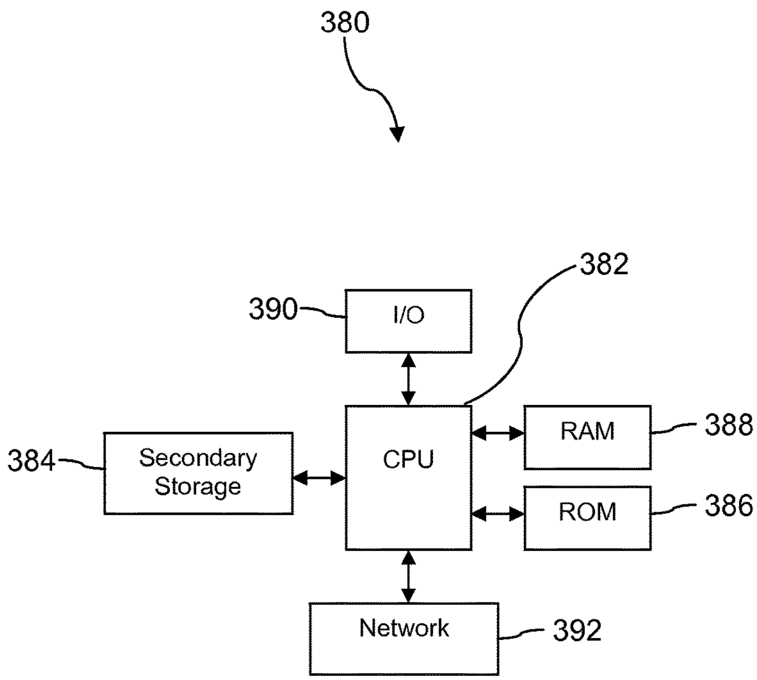
FIG. 3 illustrates an exemplary computer system suitable for implementing the several embodiments of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:

a computer having a processor and a memory; and an application stored in the memory that, when executed by the processor, identifies a plurality of customer sites;

receives customer input information for each of the customer sites, wherein the customer input information includes services provided by the customer sites, the redundancy of the services provided by the customer sites, and one or more of a user inputted priority level for each of the customer sites, a number of employees at each of the customer sites, or revenue generated at each of the customer sites;

monitors a performance of each of the customer sites and service to each of the customer sites, wherein the monitoring comprises using a tracing utility to identify a plurality of routers traversed by data packets and to determine a performance of each router including an amount of network jitter, data packet loss, and latency associated with each router;

determines content of one or more trouble tickets for each of the customer sites based on issues in the monitored performance for each of the customer sites;

prioritizes the trouble tickets;

for at least one customer site of the plurality of customer sites, independently monitors a service identified via the customer input information and provided by the customer site, wherein the service is independently monitored separate from other activity at the customer site;

responsive to the independent monitoring of the service, reprioritizes a trouble ticket for a service issue at the customer site based on a status of the independently monitored service and a redundancy of the service identified via the customer input information, wherein the trouble ticket is given a higher priority when the independently monitored service is affected and there is no redundancy of the service than when the independently monitored service is not affected or there is redundancy of the service, and wherein maintenance is prioritized based on the independent monitoring of the service;

receives additional customer input information, after the one or more trouble tickets have been determined for the customer site;

reprioritizes the one or more trouble tickets for that customer site based on the additional customer input information;

generates and displays to a user on a user interface a geographic network map that illustrates each of the customer sites;

receives a selection input of one of the customer sites from the user via the user interface;

responsive to receiving the selection input, displays the customer input information for the selected customer site on the user interface;

receives a filtering criteria from the user via the user interface to filter the customer sites shown on the geographic network map based on one or more of the customer input information; and responsive to receiving the filtering criteria, generates and displays to the user on the user interface an updated geographic network map that illustrates the filtered customer sites.

2. The system of claim 1, wherein the computer is a router.

3. The system of claim 1, wherein the computer is a network monitoring tool.

4. The system of claim 1, wherein the service(s) provided by the customer site comprise one or more of: email hosting, domain name system (DNS), virtual private networks (VPN) access, and Internet.

5. A system, comprising:

a computer having a processor and a memory; and an application stored in the memory that, when executed by the processor, identifies a plurality of customer sites;

receives customer input information for each of the customer sites, wherein the customer input information includes a user inputted priority level for the customer site, a number of employees at the customer site, a type of customer site, services provided by the customer site, and the redundancy of the services provided by the customer site;

monitors end-to-end data communication between the customer sites, performance of each of the customer sites, and service to each of the customer sites, wherein the monitoring comprises using a tracing utility to identify a plurality of routers traversed by data packets between the customer sites and to determine a performance of each router including an amount of network jitter, data packet loss, and latency associated with each router;

determines content of one or more trouble tickets for each of the customer sites based on issues in the monitored performance for each of the customer sites;

creates the one or more trouble tickets containing the determined content, wherein a customer may access the one or more trouble tickets;

prioritizes the one or more trouble tickets based on the customer input information;

for at least one customer site of the plurality of customer sites, independently monitors a service identified via the customer input information and provided by the customer site, wherein the service is independently monitored separate from other activity at the customer site;

responsive to the independent monitoring of the service, reprioritizes a trouble ticket for a service issue at the customer site based on a status of the independently monitored service and a redundancy of the service identified via the customer input information, wherein the trouble ticket is given a higher priority when the independently monitored service is affected and there is no redundancy of the service than when the independently monitored service is not affected or there is redundancy of the service, and wherein maintenance is prioritized based on the independent monitoring of the service;

generates and displays to a user on a user interface a geographic network map that illustrates each of the customer sites;

receives a selection input of one of the customer sites from the user via the user interface;

responsive to receiving the selection input, displays the customer input information for the selected customer site on the user interface;

receives a filtering criteria from the user via the user interface to filter the customer sites shown on the geographic network map based on one or more of the customer input information; and responsive to receiving the filtering criteria, generates and displays to the user on the user interface an updated geographic network map that illustrates the filtered customer sites.

6. The system of claim 5, wherein the computer is a router.

7. The system of claim 5, wherein the computer is a network monitoring tool.

8. The system of claim 5, wherein the application is further operable to:

receive additional customer input information, after the one or more trouble tickets have been determined for a customer site; and reprioritize the one or more trouble tickets for that customer site based on the additional customer input information.

9. The system of claim 5, wherein the services provided by the customer site comprise one or more of: email hosting, domain name system (DNS), virtual private networks (VPN) access, and Internet.

10. The system of claim 5, wherein the application is further operable to notify a customer of the one or more trouble tickets, and wherein the notifications are determined based on the customer input information.

11. A method for analyzing network management using customer provided information, each step in the method performed by an application stored in a non-transitory memory and executed by a processor, the method comprising:

identifying a plurality of customer sites;

receiving customer input information for each of the customer sites, wherein the customer input information includes a user inputted priority level for the customer site, a number of employees at the customer site, a type of customer site, services provided by the customer site, and the redundancy of the services provided by the customer site;

monitoring end-to-end data communication between the customer sites, performance of each of the customer sites, and service to each of the customer sites, wherein the monitoring comprises using a tracing utility to identify a plurality of routers traversed by data packets between the customer sites and to determine a performance of each router including an amount of network jitter, data packet loss, and latency associated with each router;

determining content of one or more trouble tickets for each of the customer sites based on issues in the monitored performance for each of the customer sites;

creating the one or more trouble tickets containing the determined content, wherein a customer may access the one or more trouble tickets;

prioritizing the one or more trouble tickets based on the customer input information;

for at least one customer site of the plurality of customer sites, independently monitoring a service identified via the customer input information and provided by the customer site, wherein the service is independently monitored separate from other activity at the customer site;

responsive to the independent monitoring of the service, reprioritizing a trouble ticket for a service issue at the customer site based on a status of the independently monitored service and a redundancy of the service identified via the customer input information, wherein the trouble ticket is given a higher priority when the independently monitored service is affected and there is no redundancy of the service than when the independently monitored service is not affected or there is redundancy of the service, and wherein maintenance is prioritized based on the independent monitoring of the service;

generating and displaying to a user on a user interface a geographic network map that illustrates each of the customer sites;

receiving a selection input of one of the customer sites from the user via the user interface;

responsive to receiving the selection input, displaying the customer input information for the selected customer site on the user interface;

receiving a filtering criteria from the user via the user interface to filter the customer sites shown on the geographic network map based on one or more of the customer input information; and responsive to receiving the filtering criteria, generating and displaying to the user on the user interface an updated geographic network map that illustrates the filtered customer sites.

12. The method of claim 11, further comprising:

receiving additional customer input information, after the one or more trouble tickets have been determined for a customer site; and reprioritizing the one or more trouble tickets for that customer site based on the additional customer input information.

13. The method of claim 11, wherein the services provided by the customer site comprise one or more of: email hosting, domain name system (DNS), virtual private networks (VPN) access, and Internet.

14. The method of claim 11, wherein customer input information also includes revenue generated at the customer site.

15. The method of claim 11, further comprising notifying a customer of the one or more trouble tickets, wherein the notifications are determined based on the customer input information.

16. The system of claim 1, wherein the application further:

analyzes previously monitored historical performance of each of the customer sites;

determines that a router is subject to queue overflow during a particular period of time; and configures network traffic to avoid the router during the particular period of time.

* * * * *